(12) United States Patent
Spurling et al.

(10) Patent No.: US 10,907,539 B2
(45) Date of Patent: Feb. 2, 2021

(54) DEFLECTION APPARATUS FOR AN ENGINE

(71) Applicant: Ford Global Technologies, LLC, Dearborn, MI (US)

(72) Inventors: Michael Spurling, Romford (GB); Daniel Meckenstock, Wuppertal (DE); Marius Sawatzki, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 16/279,853

(22) Filed: Feb. 19, 2019

(65) Prior Publication Data

US 2019/0277191 A1   Sep. 12, 2019

(30) Foreign Application Priority Data

Mar. 6, 2018  (DE) .................. 10 2018 203 286

(51) Int. Cl.
*F02B 77/08* (2006.01)
*F02B 61/00* (2006.01)

(52) U.S. Cl.
CPC .............. *F02B 77/08* (2013.01); *F02B 61/00* (2013.01); *F02B 2275/02* (2013.01)

(58) Field of Classification Search
CPC ...... F02B 77/08; F02B 61/00; F02B 2275/02; B60T 7/065; F02F 1/00; F02F 1/24; B60R 19/023
See application file for complete search history.

(56) References Cited

U.S. PATENT DOCUMENTS

| | | | |
|---|---|---|---|
| 5,531,135 A | 7/1996 | Dolla | |
| 5,603,515 A * | 2/1997 | Bock | F02F 1/166 277/591 |
| 8,960,049 B2 | 2/2015 | Murayama et al. | |
| 2004/0040409 A1 * | 3/2004 | Nebuya | B60T 7/065 74/560 |

FOREIGN PATENT DOCUMENTS

| | | |
|---|---|---|
| DE | 102004008647 A1 | 9/2005 |
| DE | 102010012484 A1 | 9/2011 |
| DE | 102016207778 A1 | 11/2016 |
| JP | H10338167 A | 12/1998 |
| JP | 2015223891 A | 12/2015 |
| JP | 2016070092 A | 5/2016 |

* cited by examiner

*Primary Examiner* — Jacob M Amick
*Assistant Examiner* — Charles Brauch
(74) *Attorney, Agent, or Firm* — Geoffrey Brumbaugh; McCoy Russell LLP

(57) ABSTRACT

Methods and systems are provided for one or more deflector elements coupled to an engine. In one example, a system includes a deflector element physically coupled to an interface at which edges of an engine head and an engine block join, wherein the deflector element extends around a portion of the edge and a screw boss, where the screw boss bulges out from the edges.

17 Claims, 6 Drawing Sheets

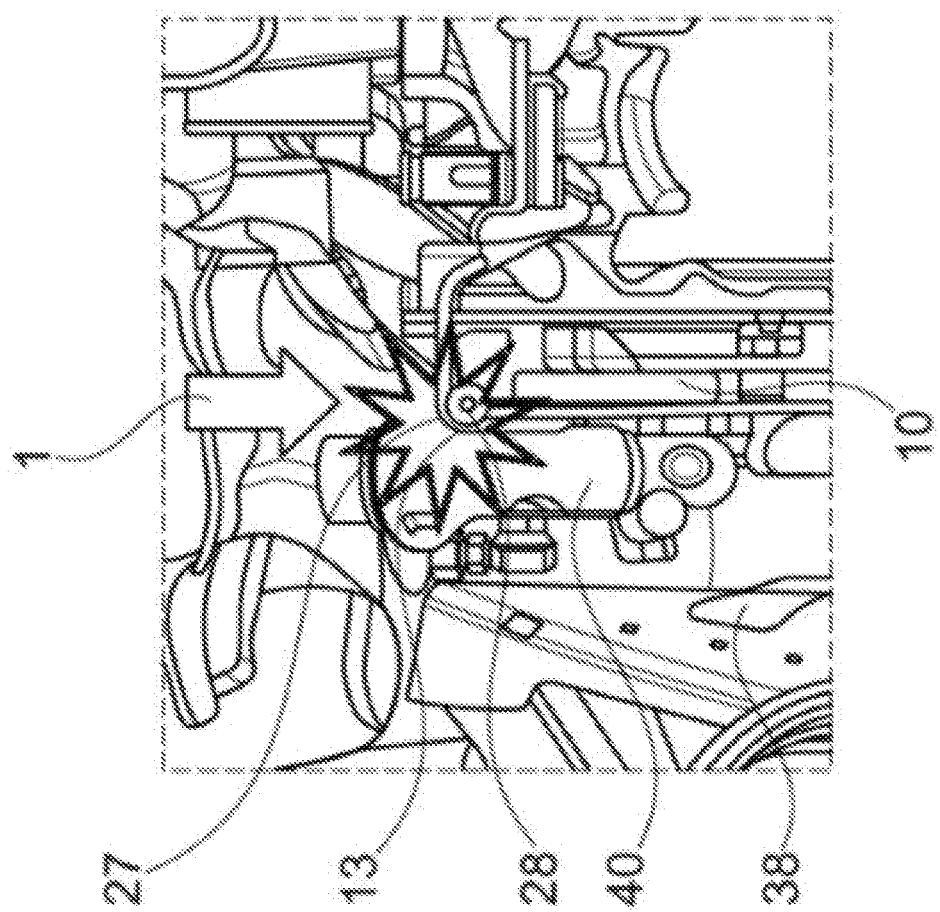

DEFLECTION APPARATUS FOR AN ENGINE

CROSS REFERENCE TO RELATED APPLICATION

The present application claims priority to German Patent Application No. 102018203286.6, filed Mar. 6, 2018. The entire contents of the above-listed application are hereby incorporated by reference for all purposes.

FIELD

The present description relates generally to a deflection apparatus arranged on an engine for deflecting a brake booster path.

BACKGROUND/SUMMARY

Vehicles may comprise an engine in an engine bay. Further components such as a brake booster may also be arranged in the engine bay. In some examples, the brake booster is arranged in a longitudinal direction of the vehicle between the engine and a vehicle interior. As vehicle packages become more compact, a space between the brake boost and the vehicle interior may decrease. This reduction in space may lead to the brake booster extending into the vehicle interior during some vehicle collisions.

Other attempts to address brake booster penetration into a footwell of a vehicle interior include arranging features shaped to deflect a path of the brake booster. One example approach is shown by Schulz in DE 102004008647A1. Therein, a sliding chamfer is arranged on an engine mount to avoid a high force on the brake booster. An additional sliding chamfer is provided on a brake booster. In a frontal collision, the engine mount is displaced in the direction of the brake booster and the two sliding chamfers slide on each other, thus causing a rotation of the brake booster.

However, the inventors herein have recognized potential issues with such systems. As one example, for a desired performance, the proposed solution disadvantageously needs two sliding chamfers, one arranged on the brake booster and the other on the engine mount. Therefore, mass-produced brake-boosters may not be used, resulting in increased manufacturing costs and time. Furthermore, the chamfer on the brake booster is still reliant on the engine mount moving in a certain direction, otherwise, the brake booster may still penetrate the footwell during a collision. Lastly, due to the shape and arrangement of the engine mount, the brake booster shown by Schulz may still penetrate the footwell during lateral vehicle collisions. Lastly, in the region of the engine mount, there is little space for the manual intervention needed for example for service activities on the brake booster.

Another example, if shown by Dolla in U.S. Pat. No. 5,531,135, which discloses a predetermined buckling region produced in the front bulkhead of the vehicle. On a frontal impact, the pedal lever connected with the bulkhead is displaced. The predetermined buckling region is positioned in the vicinity of the brake booster. After a frontal impact, the predetermined buckling region, preferably provided above the brake booster, yields and hence allows a rotational movement of the rigid connection. The solution of said publication does not teach deflecting the brake booster away from the collision direction, so there remains a danger that the pedal will nonetheless be pushed into the passenger compartment by the brake booster.

Another example is shown by Senda in JP 2015223891, which proposes a cladding which has a structure for deflecting a brake booster upward into the passenger compartment, which again leads to a reduction in size of the passenger compartment.

Another example is shown by Yamazaki et al. in JP 2016070092, which describes a clip for a fuel hose which is deformed by a brake booster in a collision, in order to prevent damage to the fuel hose.

Another example, showing a brake booster arrangement, is shown by Bottcher et al. in DE 102010012484, which shows that the brake booster arrangement is designed for a motor vehicle. It has a brake booster and a carrying structure arrangement which at least in regions forms a floor structure of the vehicle bodywork. The brake booster is spaced from the brake pedal and arranged in the region of the floor structure of the vehicle. The publication does not propose any solution for an accident situation, but merely proposes an easily accessible arrangement of the brake booster.

Another example is shown by Murayama et al. in U.S. Pat. No. 8,960,049, which also proposes an arrangement of the brake booster in an easily accessible region of the engine bay.

However, each of these previous examples fails to at least partially solve the issues recognized by the inventors. In one example, the issues described above may be addressed by A system comprising an engine head physically coupled to an engine block, wherein a deflector element is arranged at an edge where the engine head and the engine block interface, wherein the deflector element tracks a contour of the edge and at least partially traverses a screw boss for fastening the engine head and the engine block together. In this way, a component near the engine may contact the deflector element during a vehicle collision, wherein the deflector element may deflect the component in a desired direction different than a direction of the vehicle collision.

As one example, deflector element comprises a chamfer shaped to deflect the component in a direction perpendicular to the direction of the vehicle collision. The chamfer may be angled relative to the direction of the vehicle collision, wherein the angle may be an obtuse angle. In one example, the direction of the vehicle collision is parallel to a longitudinal axis of the vehicle, the longitudinal axis extending through a vehicle front-end and rear-end. As such, in one example, the vehicle collision is a frond-end and/or head-on vehicle collision. The component may be arranged between the engine and a passenger compartment, such that the deflector may deflect the component in a vertical direction, thereby decreasing a penetration of the component into the passenger compartment as the engine is compressed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 1A shows an engine bay with a conventional engine and a mechanical brake booster.

FIGS. 2A-3 are shown approximately to scale, although other relative dimensions may be used, if desired.

DETAILED DESCRIPTION

Figure 1B:
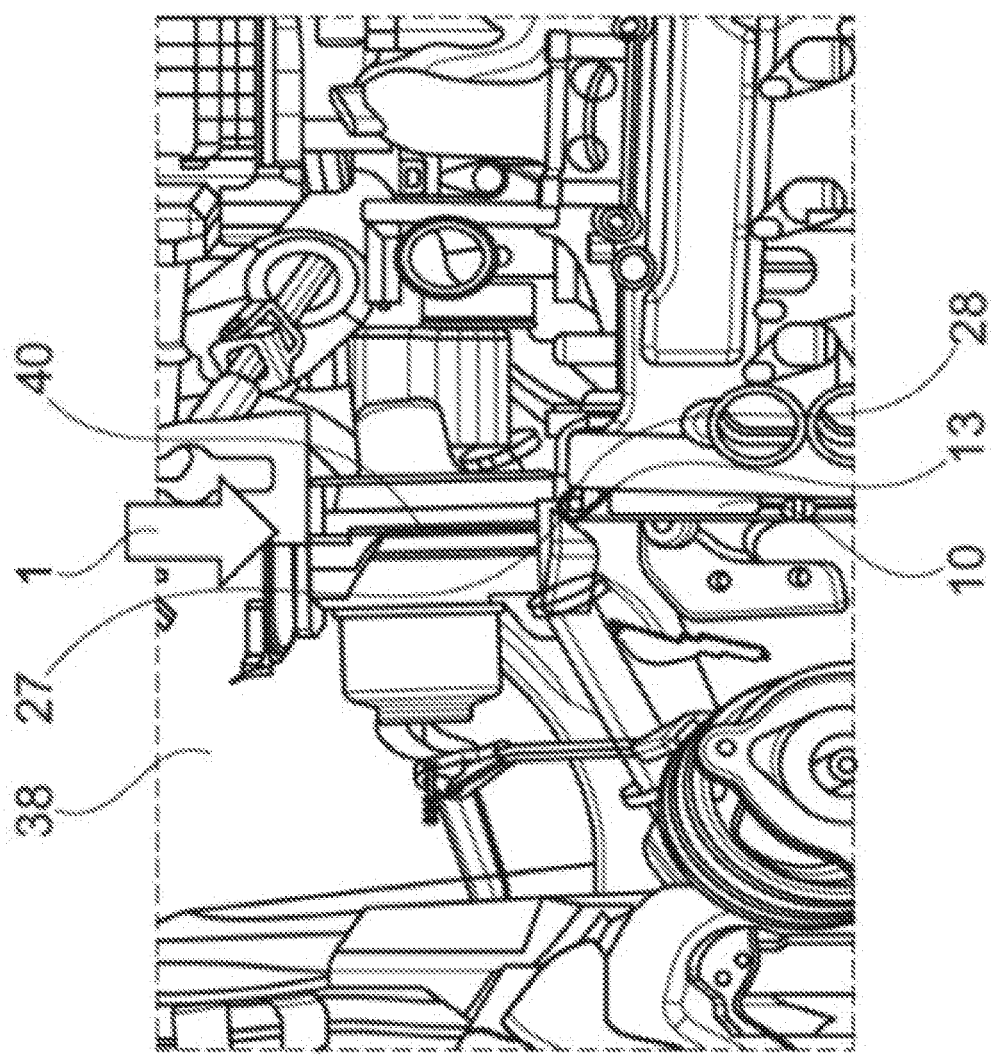
FIG. 1B shows an engine bay with a conventional engine and an electric brake booster.
Figure 2A:
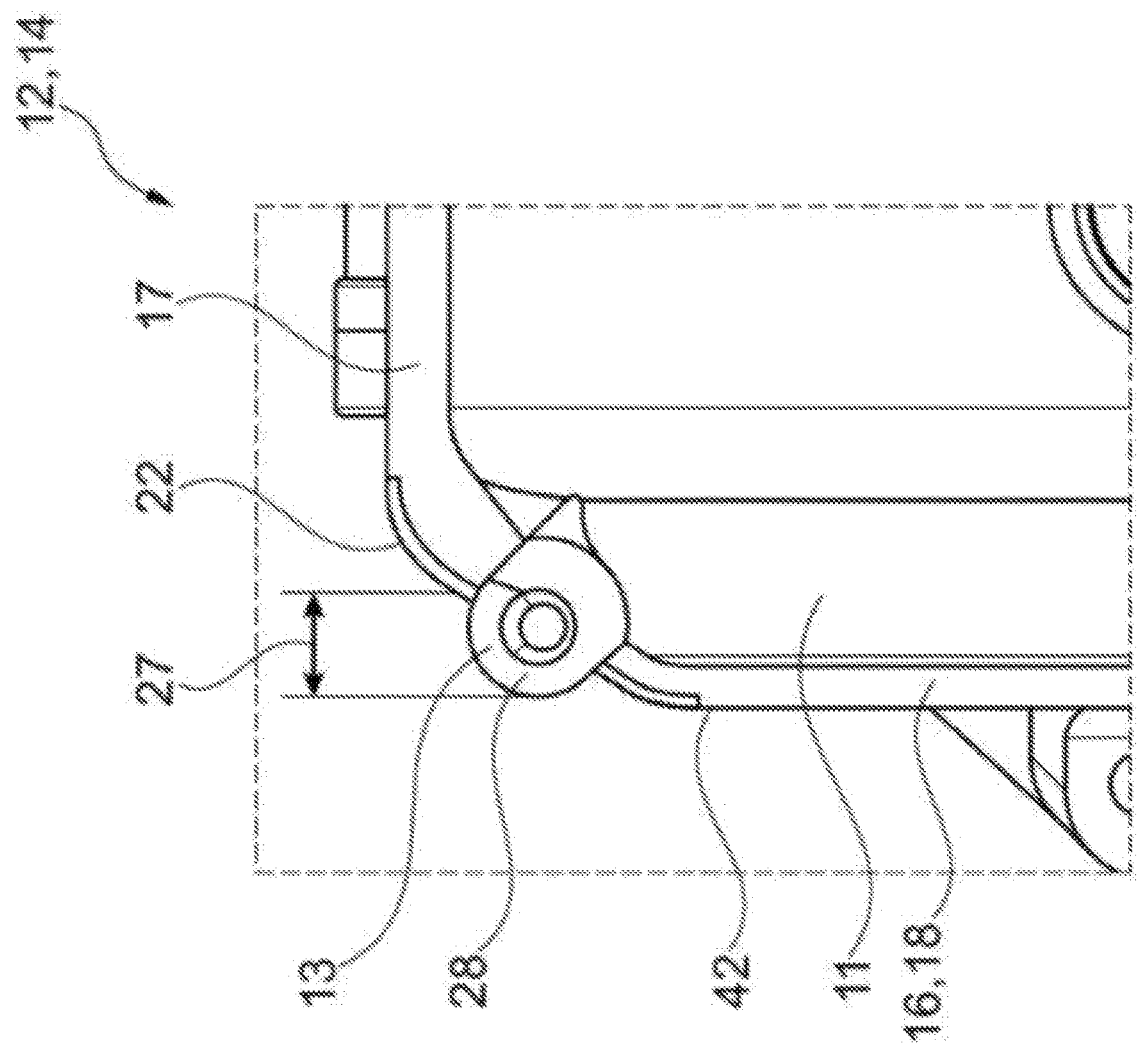
FIG. 2A shows a conventional corner with a screw boss.
Figure 2B:
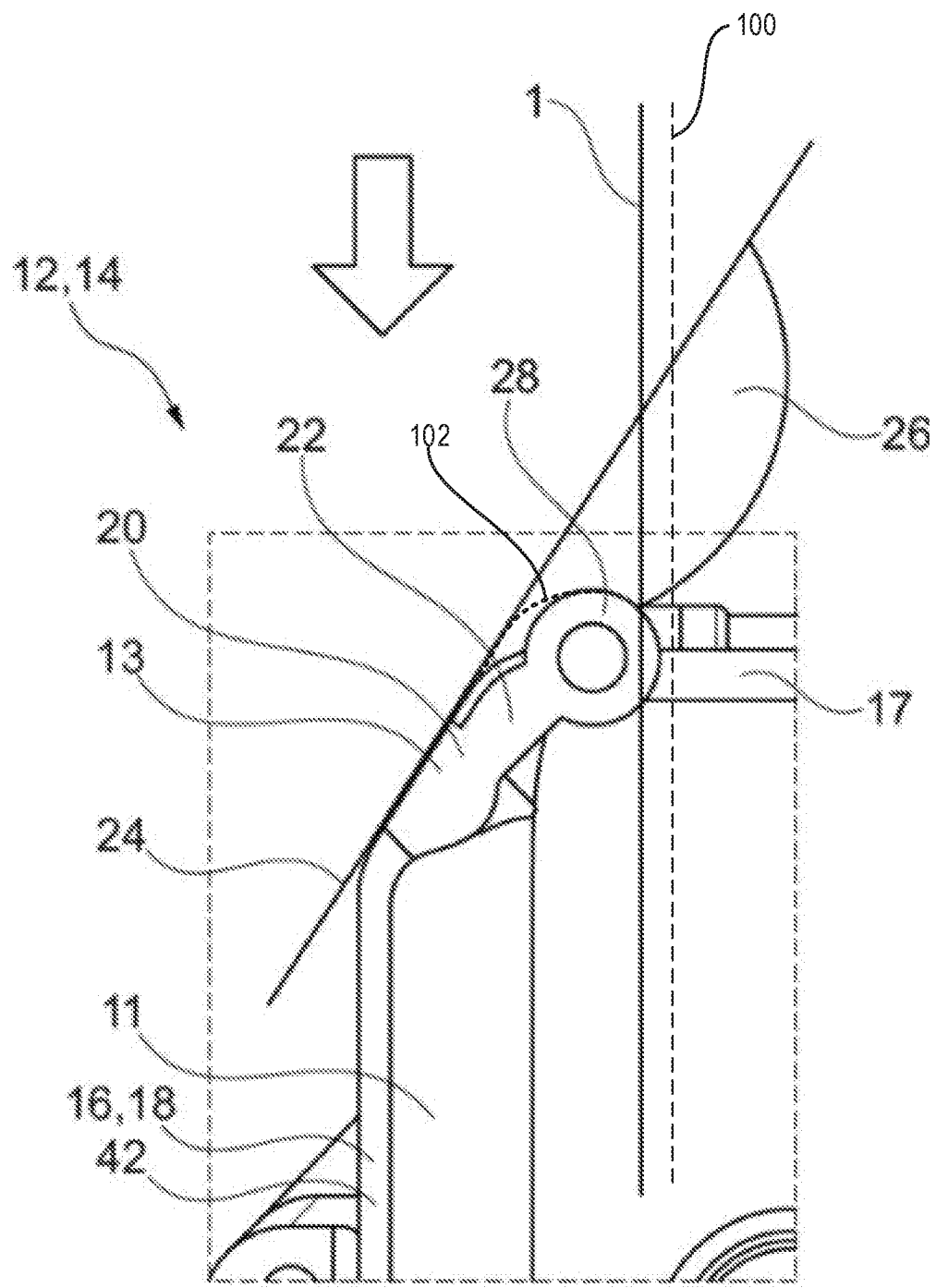
FIG. 2B shows a chamfer of a deflector element according to the disclosure next to a screw boss.
Figure 3:
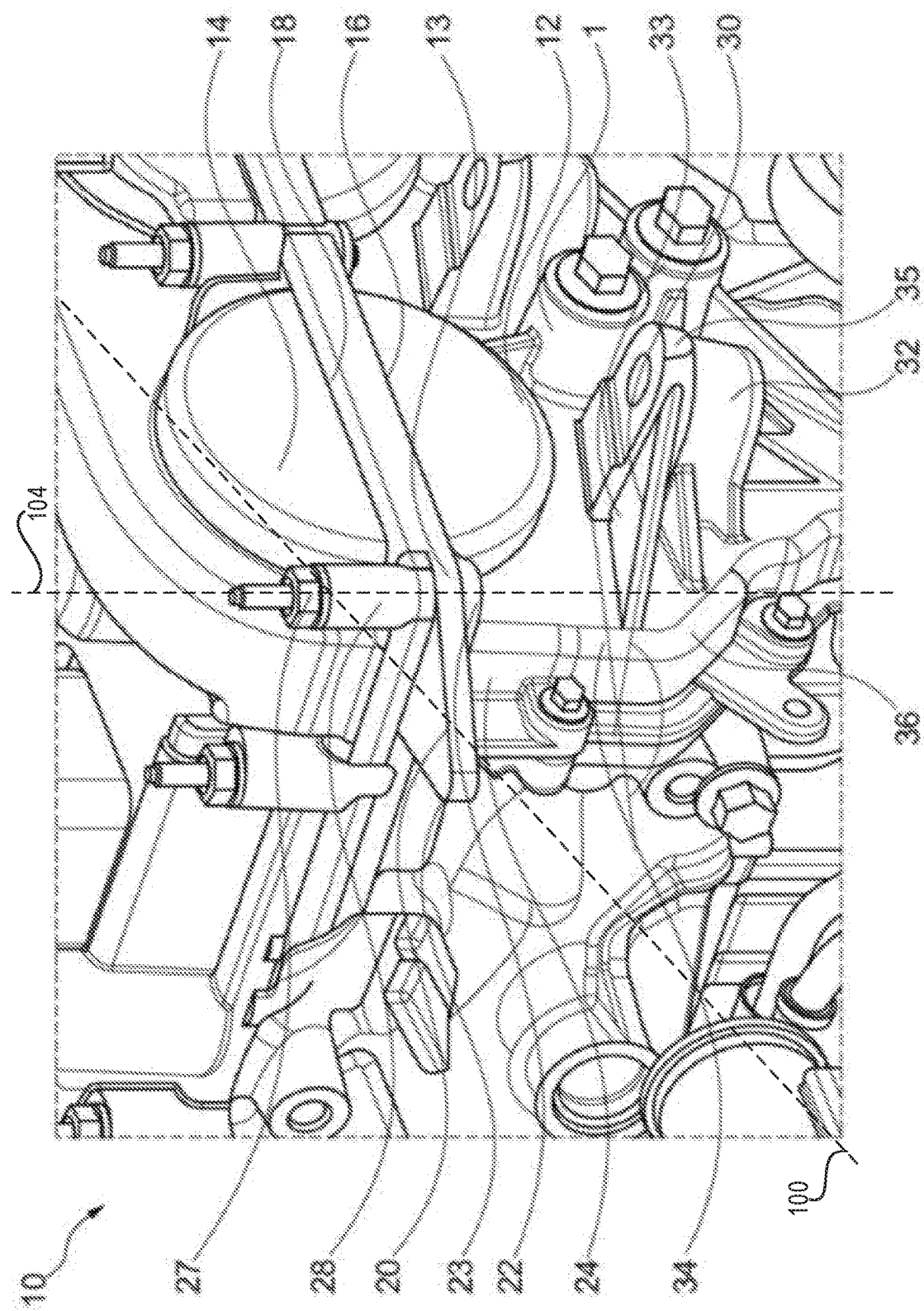
FIG. 3 shows a deflector element on an engine, in the form of an extension with a free distal end.
Figure 4:
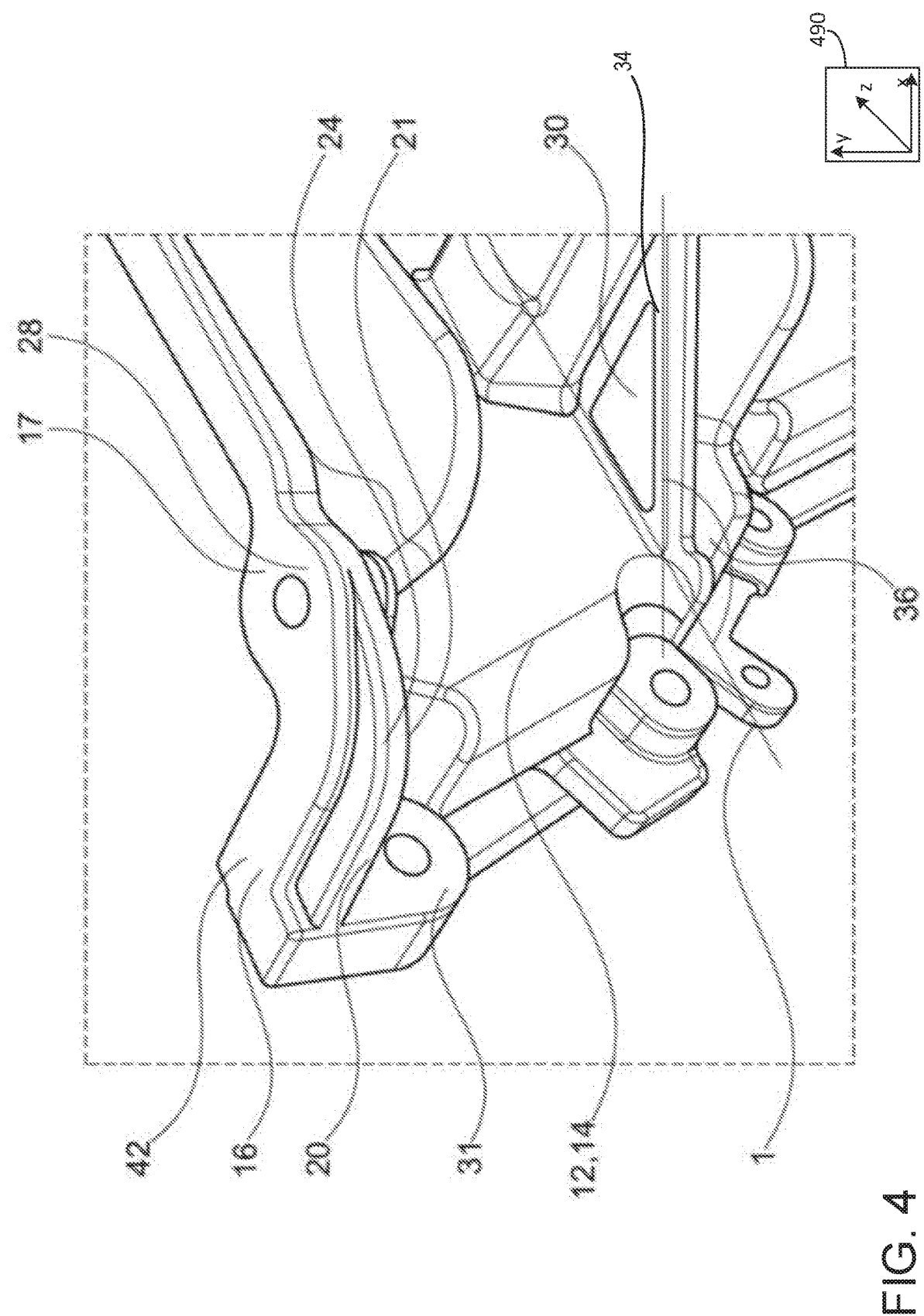
FIG. 4 shows an alternative extension-like deflector element adjoining the engine.

The following description relates to systems for one or more deflector elements arranged on an engine. FIGS. 1A, 1B, and 2A illustrate previous examples of various engine layouts with components adjacent thereto. The previous examples do not comprise a deflector element, and as such, the engine may contact the component as it is compressed during a vehicle collision, which may enable the component to penetrate a passenger compartment. FIGS. 2B, 3, and 4 illustrate examples of an engine comprising one or more deflector elements shaped to deflect a component adjacent to the engine away from the passenger compartment during a vehicle collision which may result in the engine being compressed.

In one embodiment, a brake booster may be arranged opposite a portion of the engine which has a corner. In a collision, the engine bay may be compressed and hence its size reduced. Compression of the engine bay takes place in a direction parallel to a direction of the collision. A corner has at least one portion which encloses and/or extends in the direction creating an angle amounting to around ≤90°. Due to the compression of the engine bay along the direction of the collision, the brake booster moves in the direction of the engine portion with the corner due to a contact therebetween. The brake booster impacts the portion of the corner, which is oriented disadvantageously relative to the direction of the collision, with a high force. Thus an unacceptably high proportion of the energy released in the impact is conducted along the axis of the direction of the collision and into the brake booster. Due to the force thus transferred to the brake booster, a brake pedal connected to the brake booster may move into a footwell of a passenger compartment. The size of the passenger compartment, in particular the footwell or space behind the dashboard, may be reduced.

The disclosure is based on an engine for a vehicle which, in a collision compressing the engine bay, deflects a brake booster and blocks displacement of the brake pedal into the passenger compartment. Furthermore, the features used to deflect the brake booster are shaped such that the brake booster is relatively accessible for maintenance.

The engine according to the disclosure is provided for a vehicle. The engine contains a cylinder block and a cylinder head. The cylinder block and the cylinder head each have an edge which surrounds a surface of the cylinder block and cylinder head on one side. The respective surfaces of the cylinder block and cylinder head are placed on each other so that the respective edges lie adjacent to and align with each other. Thus, the cylinder block and the cylinder head may be in face-sharing contact wherein edges of the two are aligned with one another such that one edge does not protrude more than another. The cylinder block and/or the cylinder head may have a corner. The corner may extend beyond the edges, which at least in portions may be shaped to be complementary to each other. Said another way, the corner may be shaped to extend directly from one of the two edges. The corner may be formed from walls of the engine. Furthermore, the corner may for example have a screw boss.

In one example, a deflector element with a chamfer may be arranged on the edge in the region of the corner. The chamfer gives an outer contour of the corner in the region of the edge a greater angle relative to a direction of the collision, wherein the chamfer and the direction of the collision enclose an obtuse angle, unlike the previous example which formed an acute angle.

If the vehicle is involved in a collision in which the collision direction aligns with a longitudinal axis of the vehicle (e.g., the collision is a head-on, front-end collision), the engine bay may then be reduced in size in the collision direction. If now a brake booster is arranged in the engine bay opposite the corner, and if the deflector element according to the disclosure were not present, the brake booster may move along the longitudinal axis along a load path created via a transfer of force from the corner to the brake booster. The load path is the travel of the brake booster or another component which is generated by the force of an impact.

If the brake booster hits the corner with the deflector element, the brake booster is advantageously deflected from the preferential direction along the chamfer so that the load path changes. The load path is changed via the obtuse angle formed between the chamfer and the longitudinal axis of the vehicle. The chamfer may allow the deflector element to transfer load to the brake booster or other component in a direction angled to the longitudinal direction, thereby mitigating a likelihood of the brake booster or other device penetrating the footwell of the passenger compartment.

In this way, a pedal, mechanically connected to the brake booster and extending into the passenger compartment, may not be displaced further into the passenger compartment or may be displaced to a lesser extent in comparison to the corner of the previous example without the deflector element. In this way, the footwell of the vehicle interior may not be penetrated. Also, the brake booster is advantageously positioned for service work since it is located at the height of the edge, so that the brake booster can easily be accessed by lifting an engine hood or removing an underfloor cladding.

The load path may lie directly between a rear right-hand corner of the engine block and the brake booster, wherein the engine may be a four-cylinder in-line engine. It is also conceivable that such a deflector element may operate as desired for a load path lying directly between left-hand corner of the engine block and the brake booster.

The deflector element or a further deflector element may also deflect other components. For example, depending on a layout of the vehicle (e.g., left-hand drive vs. right-hand drive), an ESP module in a left-hand drive vehicle, in a position similar to a brake booster in the right-hand drive vehicle, may produce a load path into the bulkhead and hence onto the occupant's side of the bulkhead into a glovebox arranged on the passenger side.

In one example, the angle between the chamfer and the longitudinal axis of the vehicle is obtuse and amounts to >90°. Advantageously, the chamfer of the deflector element may create an angle of around 150° with the longitudinal axis, wherein the angle is measured from the outer contour in the region of the corner. This creates a sloping plane which greatly reduces a force in the direction of the passenger compartment.

The deflector element is formed in two different embodiments, wherein a first embodiment comprises a deflector element which is formed from walls of the engine, in particular of the cylinder head or cylinder block. This gives a chamfer next to which a screw boss is arranged. No further structure may be arranged on the chamfer, so the chamfer forms a straight plane. Advantageously therefore, no screw boss and no corner is formed between the brake booster and the chamfer, and the brake booster can slide unhindered on the chamfer and hence be deflected away from the longitudinal axis. In a second embodiment, a deflector element is formed as an extension which protrudes from the outer contour of the engine. Here, the deflector element may protrude from the edge of the cylinder head and/or the cylinder block. Thus the chamfer is situated in front of a corner along the longitudinal axis, and the brake booster firstly collides with the chamfer and is deflected thereby. This extension-like deflector element may adjoin the outer contour as a rib or protrude therefrom with a distal, free-standing end.

In an advantageous refinement of the extension-like deflector element, a screw boss of the deflector element arranged on the corner is at least partially enclosed by the deflector element. Thus the bulging outer contour of the screw boss is covered by the deflector element, so that the chamfer of the deflector element is arranged in front of the screw boss. Collision of the brake booster with the screw boss is thus avoided, and deflection of the brake booster is possible.

The extension-like deflector element may be formed integrally with the cylinder block or cylinder head. It is preferably formed by a casting process. Alternatively, it may be formed by material removal from the engine. In this way, the deflector element may be provided by an economic process during production of the engine.

In an advantageous alternative, the deflector element may be fixed to the cylinder block or cylinder head via a coupling element such as bolts or pins. Threads or bores may be provided in the engine for the coupling element, wherein clamps may be used for fixing the deflector element. More specifically, the bolts for fixing the cylinder head to the cylinder block may be used to attach the deflector element. In this way, a standardized engine may later be equipped with the deflector element without forming additional bores and threads in the walls of the engine. That is to say, the deflector element may be retrofitted as an aftermarket component to pre-existing engines.

In addition to the embodiments already described, an additional deflector element may be formed on an engine mount, so that the protruding engine mount may have a chamfer in the same direction along the longitudinal axis or a different direct along a different axis, such as a lateral axis or a vertical axis. The chamfer encloses an obtuse angle with the longitudinal axis or the lateral and vertical axes. In this way, further components or the brake booster in the engine bay may be deflected in a collision.

The engine according to the disclosure is arranged in the engine bay of the vehicle, in particular in the direction of travel or in a transverse orientation relative to the direction of travel, and the deflector element stand opposite a brake booster. The brake booster is arranged in the vehicle at the height of the edge on which the deflector element is arranged. Thus, the brake booster may be more easily accessible than the previous examples. The brake booster may be an electric or a mechanical brake booster, in particular equipped with a pull-rod or a push-rod or a tension anchor.

On a frontal impact of the vehicle parallel to the longitudinal axis, when the brake booster hits the corner, the deflector element generates a force in the collision direction or in the vehicle longitudinal direction (X direction) which is less than 10 kN. The deflector element splits the incoming longitudinal force into a reduced longitudinal force and a deflected force component in the vehicle transverse direction (Y direction). It displaces the brake booster (in this case) laterally or rotates it about the vehicle vertical axis (Z axis) via contact with the chamfer of the deflector element. In this way, the size of the passenger compartment may be less reduced or not reduced at all.

Similar relationships may arise depending on the engine bay architecture, but also with other components than the brake booster described, such as e.g. with voltage converters, charger devices, ESPs, heater units etc. which may interact with engine parts or have a load path in the direction of a bulkhead in front of the passenger compartment. That is to say, the deflector element may deflect the components described above in a manner similar to the brake booster to decrease and/or block penetration of a component into the passenger compartment.

FIGS. 1A-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIGS. 1A and 1B show an engine 10 of a previous example, which does not comprise a deflector element. The embodiment of FIG. 1A has a mechanical brake booster 40 which is actively connected to a pedal via a pull-rod or push-rod or a tension anchor. FIG. 1B shows an embodiment with an electric brake booster which is also connected to a pedal arranged in the passenger compartment. The brake booster 40 of FIGS. 1A and 1B is arranged in an engine bay 38 between the engine 10 and a passenger compartment (not shown). The pedal is arranged in the passenger compartment. The passenger compartment and the engine bay are separated from each other by a bulkhead.

FIGS. 1A and 1B show how, due to a collision, an engine bay 38 of the vehicle is compressed in a collision direction 1, whereby the brake booster 40 is moved relative to a corner 13. A frontal impact of the vehicle in the collision situation displaces the engine 10 onto the brake booster 40. The brake booster 40 then collides with the corner 13 of the engine 10. The corner 13 with the screw boss 28 conducts the force directly into the brake booster 40 in the preferential direction. The force may be greater than 10 kN. As such, the pedal connected to the brake booster 40 may be pushed into the passenger compartment by this force.

A screw boss 28 is arranged on the corner 13 in FIGS. 1A and 1B. The screw boss 28 constitutes a bulge 27 oriented transversely to the collision direction 1, so that the high force acts on the brake booster 40 in the collision direction 1.

The engine 10 is arranged transversely to the collision direction 1 so that a crankshaft of the engine 10 may be oriented transversely to the collision direction 1.

FIG. 2A shows a screw boss 28 included in the previous example shown in FIGS. 1A and 1B, arranged at a corner 13. The screw boss 28 shapes a bulge 27 which protrudes from an outer contour 22 of edges 16, 18 of the cylinder block 12 and the cylinder head 14.

An edge 16 on the cylinder block side surrounds a surface 17 of a lower portion wall 42 of the cylinder block 12, while an edge 18 on the cylinder head side surrounds the surface 17 of an upper portion of the wall 42 of the cylinder head 14. The wall 42 delimits an interior 11 of the engine 10. The respective surface 17 is oriented transversely to the wall 42, wherein the cylinder block 12 and cylinder head 14 are joined together by their surfaces 17 so that the edges lie next to each other after assembly.

Turning now to FIG. 2B, to reduce the forces acting on the brake booster, according to the disclosure a deflector element 20 is arranged on the corner 13, providing a chamfer 24 on which the brake booster 40 can slide in the event of a collision. Such a deflector element 20 is physically coupled to the wall 42. The deflector element 20 may be continuous with the wall 42, such that there are no intervening components arranged therebetween.

To shape the chamfer 24, a portion of the wall 42 is angled away from the collision direction 1, directly at the corner 13, so that the longitudinal axis 100 and the inclined portion of the wall 42 shape an obtuse angle 26 which is greater than 90°. The screw boss 28 is moved relative to the example shown in FIG. 2A, and arranged next to the inclined portion and on a part of the wall 42 which is oriented approximately perpendicularly to the longitudinal axis 100 of the vehicle. Thus the screw boss 28 is moved out of the collision direction of the brake booster 40, and on impact with the chamfer 24, the brake booster 40 can slide with a low force in the collision direction 1. The force which acts on the brake booster 40 in the collision direction 1 is <10 kN. This may be achieved if the angle 26 which is an obtuse angle. In some examples, the angle 26 is between 100 to 170 degrees. In some examples, additionally or alternatively, the angle 26 is between 120 to 170 degrees. In some examples, additionally or alternatively, the angle 26 is between 130 to 170 degrees. In some examples, additionally or alternatively, the angle 26 is between 140 to 170 degrees. In some examples, additionally or alternatively, the angle 26 is between 140 to 165 degrees. In some examples, additionally or alternatively, the angle 26 is between 145 to 165 degrees. In some examples, additionally or alternatively, the angle 26 is between 145 to 160 degrees. In some examples, additionally or alternatively, the angle 26 is between 145 to 155 degrees. In one example, the angle 26 is exactly 150 degrees.

In the example of FIG. 2B, the deflector element 20 may extend outwardly from the corner 13. A magnitude (e.g., a length) of the extension may be equal to a magnitude of the extension of the screw boss 28 shown in FIG. 2A. By doing this, transfer forces previously provided by the screw boss 28 may be applied by the deflector element 20. However, due to the shape of the deflector element 20, transferred force loads of the deflector element 20 are different than transferred force loads of the screw boss 28 shown in FIG. 2A.

In some examples, the screw boss 28 may be maintained in the position shown with respect to FIG. 2A in combination with arranging the deflector element 20 at the corner 13. However, such an embodiment may not provide as much force in a direction perpendicular to the longitudinal axis 100, such as a vertical direction away from a ground upon which the vehicle wheels are positioned, due to a circular shape of the screw boss 28. By repositioning the screw boss 28 to a portion of the wall 42 further away from a brake booster (e.g., brake booster 40 of FIG. 1A), a greater amount of control over a direction of travel of the brake booster may be achieved in the event of a collision.

In one example, the deflector element 20 is positioned to disrupt a stack-up and/or a hook-up between the corner 13 and a master cylinder foot. In some examples, the deflector element 20 may be shaped via machining the screw boss 28 to the chamfer 24. In one example, the chamfer 24 is angled 150° relative to the longitudinal axis 100 and 45° relative to a vertical axis, perpendicular to the longitudinal axis and parallel to a direction of gravity. By shaping the chamfer 24 in such a way, the brake booster may be pushed at least somewhat along the vertical axis, as opposed to the longitudinal axis, thereby decreasing a displacement of the brake pedal or other component into a passenger interior.

In some examples, additionally or alternatively, the deflector element 20 may extend around the screw boss 28, as shown by dashed line 102. By doing this, the deflector element 20 may be shaped to reduce the force load along the longitudinal axis for a greater number of collision directions. In one example, the deflector element 20, including the dashed line 102, may deflect collisions directions angled to the collision direction 1 by ±45°.

The deflector element 20 may comprise a curved contour. As such, the deflector element 20 may not comprise a corner or other 90° shape. The chamfer 24 may be shaped on edges of the deflector element 20, wherein the chamfer is shaped to promote division of the force along the longitudinal axis 100. More specifically, the chamfer 24 is shaped to transfer some of the force along the longitudinal axis 100 to the vertical axis, in a direction away from the passenger interior.

The deflector element 20 may be cast and/or integrated into the edges 16, 18 of the engine block and engine head respectively. Additionally or alternatively, the deflector element 20 may be attached to engine head screws. A load transfer between the deflector element 20 and the engine may occur via a surface loading. In this way, the deflector element 20 may be arranged into the block/head during a manufacture of the engine or after a manufacture of the engine without departing from the scope of the present disclosure.

FIG. 3 shows an alternative embodiment of the deflector element 20 arranged on an engine 10. This deflector element 20 is formed as an extension and protrudes from the edge 16, 18. It may comprise a free distal end 23 extending along the longitudinal axis 100. Vertical axis 104 is illustrated extending in a direction perpendicular to the longitudinal axis 100.

As such, the free distal end 23 may extend in a direction perpendicular to the vertical axis 104.

The wall (e.g., wall 42 of FIG. 2B) which forms the corner 13 is not inclined relative to the longitudinal axis 100, as shown in FIG. 2B. Instead, the deflector element 20 is arranged in front of the corner 13 in the longitudinal direction 1, so that the brake booster 40 first hits the deflector element 20. In one example, the deflector element 20 included in the example of FIG. 3 is the same as the deflector element 20, including the dashed line 102 in the example of FIG. 2B. The deflector element 20 may comprise a substantially triangular cross-section in the longitudinal direction, with a base and a rounded tip at the free distal end 23.

The chamfer 24 is oriented towards the corner 13, wherein the chamfer 24 may have a straight or a curved contour. In the case of a straight contour, the cross-section is preferably triangular, whereas for a curved contour, the cross-section may in particular may be formed like a shark fin, wherein sides of a triangle (e.g., the fin) are curved and shape similar to an arc. The force acting on the brake booster 40 in the preferential direction 1 is <10 kN. The angle of the chamfer 24 relative to the vertical axis 104 is, at least in portions approximately 45° to generate the desired force in the vertical direction. Suitably, an obtuse angle is provided between the longitudinal axis (not shown in FIG. 3) and the chamfer 24.

The deflector element 20 may, as shown in FIG. 3, be connected to or produced integrally with the cylinder block 12 or cylinder head 14. This deflector element 20 is produced either by a casting process during production of the engine 10, or by a material removal process during machining of the engine 10. Alternatively, the deflector element 20 may be later mounted on, e.g. bolted to, the engine 10. In particular, this may be achieved using the bolts 27 for fixing the cylinder head 14 to the cylinder block 12. Preferably, clamps are used which fix the deflector element 20.

The deflector element 20 in FIG. 3 is oriented along the edge 16, 18 so that the chamfer 24 extends along a lateral direction perpendicular to the longitudinal axis 100 and the vertical axis 104. Alternatively, the deflector element 20 may be oriented vertically, wherein the chamfer 24 is then arranged in the vertical direction.

In addition to the deflector element 20, an additional deflector element 30 may be arranged on an engine mount 32. The engine mount 32 protruding from the cylinder block 12 then shapes a notch 33 with an internal angle, wherein the additional deflector element 30 extends from the distal end 35 of the engine mount 32 to the cylinder block 12. The additional deflector element 30 extends up to a corner 35 of the cylinder block 12. In this way, along the longitudinal axis 100, no portion of the engine mount 32 may contact a component such as e.g. a brake booster 40 in the engine bay, but slides away on the additional deflector element 30 arranged in front. The additional deflector element 30 forms an obtuse angle 36 with the longitudinal axis 100. In one example, the additional deflector element 30 is substantially similar to the deflector. That is to say, the additional deflector element 30 may contact a component prior to the engine mount 32, wherein the additional deflector element 30 may alter a trajectory of the component and/or the engine mount 32 such that the engine mount 32 and the component do not touch.

FIG. 4 shows the additional deflector element 30 arranged as described in FIG. 3. The deflector element 20 shown in FIG. 4 lies between a first screw boss 28 and a second screw boss 31 in the outer contour 22 of the edge 16 of the cylinder block 12. Because of the deflector element 20, the screw bosses 28, 31 do not form bulges 27 protruding beyond the contour of the deflector element 20. As such, the screw bosses 28, 31 may not contact a component prior to the deflector element 20. The contour of the screw bosses 28, 31 is compensated by the deflector element 20. The first screw boss 28 is enclosed by the deflector element 20 relative to the preferential direction 1. The deflector element 20 forms a curved, rib-like structure which is arranged in front of the edge 16.

The deflector element 20 has a radius 21 on at least one portion. The chamfer 24 is formed by the radius 21 so that the chamfer 24 is curved. The deflector element 20 of FIG. 4 does not extend up all the way to the surface 17 in the vertical direction. Thus, the deflector element 20 terminates prior to the surface 17 along a vertical direction. The force acting on the brake booster 40 in the preferential direction 1 is <10 kN. Preferably, this is achieved if the angle 26, shown in FIG. 2B of the chamfer 24 with the preferential direction 1 is at least in portions around 150°.

The deflector element 20 of FIG. 4, like the embodiment of FIG. 3, may also be formed integrally with the engine 10. Similarly, it may be attached, e.g. bolted in place. The deflector element 20 may also be oriented in the vertical direction so that its chamfer is oriented in a direction transversely to the edge 16.

In one example, the example of FIG. 4 shows a side/rear view of an engine comprising a first deflector element 20 and a second deflector element 30 for deflecting a brake booster or other vehicle component during a vehicle collision. An axis system 490 includes three axes, namely an x-axis parallel to a lateral direction, a y-axis parallel to a vertical direction, and a z-axis parallel to a longitudinal direction. In one example, a vehicle may be propelled in the longitudinal direction.

Each of the first deflector element 20 and the second deflector element 30 may be shaped to impart a force of the impact in a direction parallel to the y-axis (e.g., a vertical direction). More specifically, each of the first deflector element 20 and the second deflector element 30 may comprise a first chamfer 24 and a second chamfer 34. Each of the chamfers may be angled at an incline, wherein an angle of the incline is between 30 to 70°. In some examples, additionally or alternatively, the angle is 40 to 60°. In one example, the angle is 45°.

An axis extending through each of the first chamfer 24 and the second chamfer 34 may be angled relative to the z-axis (e.g., the longitudinal direction). Obtuse angle 36 illustrates one example of such an angle, wherein the obtuse angle 36 may be between 91 and 179 degrees. The obtuse angle 36 may be substantially equal to the angle 26 of FIG. 2B. As such, the first and second chamfers 24, 34 of the first and second deflector elements 20, 30, respectively, may be angled substantially identically. In one example, the obtuse angle 36 is exactly 150°.

The first deflector element 20 may comprise a J-shape, wherein the first deflector element 20 extends in a linear path before turning and extending around the screw boss 28. As shown, the first deflector element 20 extends around all of the screw boss 28 facing the longitudinal direction parallel to the z-axis so that if the screw boss is displaced along the z-axis, the first deflector element 20 may contact a component before the screw boss 28.

The second deflector element 30 may be arranged vertically lower than the first deflector element 20. The second deflector element 30 may comprise a triangle shape. As such, the second deflector element 30 may be shaped differently than the first deflector element 20 despite the second chamfer 34 and the first chamfer 24 being substantially identical.

Each of the first and second deflector elements 20, 30 are shaped to redirect a portion of a force in the z-axis to the y-axis, thereby decreasing a displacement of a component contacted by the engine in the z-direction. It will be appreciated that a brake booster or other component may be arranged between a passenger interior and the engine along the z-axis. A collision may result in a displacement of the engine and the brake booster or other component. However, the first and second deflectors 20, 30 may decrease the displacement of the brake booster or other component along the z-axis, but introducing a force to the brake booster or other component in the y-axis as the engine is crushed along the z-axis. In this way, the passenger interior may not be infiltrated by the brake booster or other component. Additionally or alternatively, the passenger interior may be infiltrated and/or penetrated less than a threshold distance by the brake booster or other component. In some examples, the threshold distance is less than 150 mm. In some examples, the threshold distance is less than 120 mm. In some examples, the threshold distance is less than 105 mm. In one example, the threshold distance is less than 90 mm.

In this way, one or more deflector elements may be arranged between an engine and a passenger compartment, wherein the deflector elements may be shaped to direct a component between the engine and the passenger compartment in a direction perpendicular to a vehicle collision direction. The technical effect of deflecting the component via the one or more deflector elements is to decrease and/or prevent a penetration of the component into the passenger compartment.

In another representation, an engine for a vehicle, comprising a cylinder block and a cylinder head, wherein the cylinder block and the cylinder head each have an edge at which they are joined together, and the cylinder block and/or the cylinder head has a corner, wherein a deflector element with a chamfer is arranged at the corner, so that an outer contour on the edge of the corner encloses with the chamfer, at least in portions, an obtuse angle relative to a preferential direction which is preferably oriented in the direction of travel of the vehicle.

An example of the engine including the example above comprises where the chamfer encloses with the preferential direction an angle of around 150° which is arranged on the outer contour in the region of the corner.

An example of the engine including any of the above examples further includes where the deflector element is an extension which protrudes from the outer contour.

An example of the engine including any of the above examples further includes where at the corner, a screw boss is arranged forming a bulge which is at least partially enclosed by the deflector element.

An example of the engine including any of the above examples further includes where the deflector element is formed integrally with the cylinder block or the cylinder head, preferably is cast as one piece.

An example of the engine including any of the above examples further includes where the deflector element is bolted to the cylinder block or the cylinder head by fixing elements such as e.g. bolts, wherein in particular bolts are used which fix the cylinder head to the cylinder block.

An example of the engine including any of the above examples further includes where the deflector element has a radius so that the chamfer has a curvature directed towards the outside or inside.

An example of the engine including any of the above examples further includes where an additional deflector element is arranged on an engine mount so that in a preferential direction, a chamfer is formed which encloses an obtuse angle with the outer contour.

A vehicle including any of the above examples further includes where an engine bay containing an engine, with a cylinder head and a cylinder block which are joined together at a respective edge, in particular as claimed in any of the preceding claims, wherein a brake booster stands opposite a corner of the engine relative to a preferential direction, wherein a deflector element is formed on the edge at the corner, so that a chamfer is formed at which the brake booster can be deflected from the preferential direction on a compression of the engine bay in the preferential direction, wherein the brake booster is positioned at the height of an edge of a cylinder head or a cylinder block of the engine at which these are joined together.

The vehicle including any of the above examples further comprises where the brake booster can be deflected by a force of less than 10 kN.

An embodiment of a system comprises an engine head physically coupled to an engine block, wherein a deflector element is arranged at an edge where the engine head and the engine block interface, wherein the deflector element tracks a contour of the edge and at least partially traverses a screw boss for fastening the engine head and the engine block together. A first example of the system further includes where the screw boss is shaped as a bulge extending outside of the contour of the edge. A second example of the system, optionally including the first example, further includes where the deflector element is arranged between the screw boss and a brake booster. A third example of the system, optionally including the first and/or second examples, further includes where the deflector element is arranged closer to a passenger interior than to a vehicle front-end. A fourth example of the system, optionally including one or more of the first through third examples, further includes where the deflector element comprises a J-shape. A fifth example of the system, optionally including one or more of the first through fourth examples, further includes where the deflector element comprises a chamfer, wherein the chamfer is shaped to form an obtuse angle with a longitudinal axis of a vehicle. A sixth example of the system, optionally including one or more of the first through fifth examples, further includes where the chamfer is arranged on a top side of the deflector element closer to the engine head than the engine block.

An embodiment of a vehicle comprises an engine mount configured to mount an engine comprising an engine head interfacing with an engine block along an edge, a first deflector element arranged on the edge, wherein the first deflector element follows a curved contour of the edge, and a second deflector element arranged on the engine mount, extending from a portion of the mount to the engine block. A first example of the vehicle further includes where the second deflector element comprises a triangle shape. A second example of the vehicle, optionally including the first example, further includes where the first deflector element comprises a first chamfer and the second deflector element comprises a second chamfer, each of the first and second chamfers angled obtusely relatively to a longitudinal axis of the vehicle, wherein the vehicle travels in a direction of the longitudinal axis. A third example of the vehicle, optionally including the first and/or second examples, further includes where each of the first chamfer and second chamfer are shaped to deflect a component arranged between the engine and a passenger interior in a vertical direction perpendicular to the longitudinal axis. A fourth example of the vehicle, optionally including one or more of the first through third examples, further includes where the component is a brake booster. A fifth example of the vehicle, optionally including one or more of the first through fourth examples, further includes where the second deflector element is shaped to contact the component before the first deflector element. A sixth example of the vehicle, optionally including one or more of the first through fifth examples, further includes where the second deflector element is arranged closer to a passenger interior than the first deflector element. A seventh example of the vehicle, optionally including one or more of the first through sixth examples, further includes where the first deflector element is vertically above the second deflector element.

A vehicle engine bay comprises an engine mount shaped to mount an engine comprising an engine head and an engine block, wherein the engine head is physically coupled to the engine block via one or more fasteners extending through a screw boss arranged at edges where the engine head and the engine block interface, a first deflector element arranged along the edges and extending over at least a portion of the screw boss, a second deflector element physically coupled to the engine mount and the engine block, and a component arranged between the engine and a passenger compartment along a longitudinal axis of a vehicle. A first example of the vehicle engine bay further includes where the screw boss is shaped as a bulge protruding from a contour of the edge, and where the first deflector element linearly follows the contour before curving and traversing over at least the portion of the screw boss. A second example of the vehicle engine bay, optionally including the first example, further includes where the first deflector element comprises a J-shape and where the second deflector element comprises a triangle shape. A third example of the vehicle engine bay, optionally including the first and/or second examples, further includes where the second deflector element is arranged closer to the component than the first deflector element, and where each of the first deflector element and the second deflector element comprises a chamfer angled greater than 90° relative to a longitudinal axis of the vehicle. A fourth example of the vehicle engine bay, optionally including one or more of the first through third examples, further includes where the component is one or more of a brake booster, a voltage converter, a charger device, electronic stability program module, and a heater unit.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system comprising:
an engine head physically coupled to an engine block, wherein a deflector element is arranged at an edge where the engine head and the engine block interface, wherein the deflector element tracks a contour of the edge and at least partially traverses a screw boss for fastening the engine head and the engine block together; and
wherein the deflector element is arranged between the screw boss and a brake booster.

2. The system of claim 1, wherein the screw boss is shaped as a bulge that extends outside of the contour of the edge.

3. The system of claim 1, wherein the deflector element is arranged closer to a passenger interior than to a vehicle front-end.

4. The system of claim 1, wherein the deflector element comprises a J-shape.

5. The system of claim 1, wherein the deflector element comprises a chamfer, wherein the chamfer is shaped to form an obtuse angle with a longitudinal axis of a vehicle.

6. The system of claim 5, wherein the chamfer is arranged on a top side of the deflector element closer to the engine head than the engine block.

7. A vehicle comprising:
an engine mount configured to mount an engine comprising an engine head interfacing with an engine block along an edge;
a first deflector element arranged on the edge, wherein the first deflector element follows a curved contour of the edge;
a second deflector element arranged on the engine mount, extending from a portion of the engine mount to the engine block; and wherein the first deflector element comprises a first chamfer and the second deflector element comprises a second chamfer, each of the first chamfer and the second chamfer angled obtusely relatively to a longitudinal axis of the vehicle, wherein the vehicle travels in a direction of the longitudinal axis.

8. The vehicle of claim 7, wherein the second deflector element comprises a triangle shape.

9. The vehicle of claim 7, wherein each of the first chamfer and the second chamfer are shaped to deflect a component arranged between the engine and a passenger interior in a vertical direction perpendicular to the longitudinal axis.

10. The vehicle of claim 9, wherein the component is a brake booster.

11. The vehicle of claim 9, wherein the second deflector element is shaped to contact the component before the first deflector element.

12. The vehicle of claim 7, wherein the second deflector element is arranged closer to a passenger interior than the first deflector element.

13. The vehicle of claim 7, wherein the first deflector element is vertically above the second deflector element.

14. A vehicle engine bay comprising:
an engine mount shaped to mount an engine comprising an engine head and an engine block, wherein the engine head is physically coupled to the engine block via one or more fasteners extending through a screw boss arranged at edges where the engine head and the engine block interface;
a first deflector element arranged along the edges and extending over at least a portion of the screw boss;
a second deflector element physically coupled to the engine mount and the engine block;
a component arranged between the engine and a passenger compartment along a longitudinal axis of a vehicle; and
wherein the screw boss is shaped as a bulge protruding from a contour of the edges, and where the first deflector element linearly follows the contour before the first deflector element curves and traverses over at least the portion of the screw boss.

15. The vehicle engine bay of claim 14, wherein the first deflector element comprises a J-shape and where the second deflector element comprises a triangle shape.

16. The vehicle engine bay of claim 14, wherein the second deflector element is arranged closer to the component than the first deflector element, and where each of the first deflector element and the second deflector element comprises a chamfer angled greater than 90° relative to the longitudinal axis of the vehicle.

17. The vehicle engine bay of claim 14, wherein the component is one or more of a brake booster, a voltage converter, a charger device, electronic stability program module, and a heater unit.

* * * * *